March 28, 1950

T. H. FAILE 2,502,252

ELECTRICAL SWIVEL CONNECTION

Filed June 30, 1945

INVENTOR
Thomas H. Faile
BY Robert Irving Williams
ATTORNEY.

March 28, 1950 T. H. FAILE 2,502,252
ELECTRICAL SWIVEL CONNECTION
Filed June 30, 1945 2 Sheets-Sheet 2

INVENTOR.
Thomas H. Faile
BY Robert Irving Williams
ATTORNEY.

Patented Mar. 28, 1950

2,502,252

UNITED STATES PATENT OFFICE 2,502,252

ELECTRICAL SWIVEL CONNECTION

Thomas H. Faile, White Plains, N. Y.

Application June 30, 1945, Serial No. 602,505

3 Claims. (Cl. 173—324)

This invention relates to electrical swivel connections.

In spite of the many types of electrical swivel connections which have previously been proposed for use, most users still employ extension cords in which the insulated leads must themselves take up all the twists to which they are subjected. These leads moreover exert resistance upon an appliance such as an electric iron, for example, whenever the appliance is turned or twisted. While the desirability of remedying these difficulties has been apparent for many years, the practical art is still, so far as is known, awaiting the provision of a form of electrical connection which meets the exacting electrical requirements and the precise mechanical requirements for satisfactory use and which at the same time meets the practical requirements for ease of assembly and for repair.

It is accordingly an object of the invention to provide electrical swivel connections which are simple of construction, are adapted for ready assembly but have substantially no tendency to loosen or come apart during use, and are capable of safe and effective use under a wide variety of conditions of operation.

A further object is the provision of means for facilitating the assembly or repair of such a connection.

Another object is the provision of improved methods for assembling electrical swivel connections.

Other objects of the invention will in part be obvious and will in part appear hereinafter.

The invention accordingly is directed to articles of manufacture the features, properties and relationship of elements of which will be exemplified in the articles hereinafter described and the scope of the application of which will be indicated in the claims.

For a fuller understanding of the nature and objects of the invention reference should be had to the following detailed description taken in conjunction with the accompanying drawings in which Figure 1 is a longitudinal sectional view of an electrical swivel connection embodying the invention;

Figure 1:
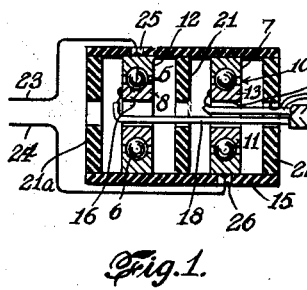

In the form of construction exemplified in Fig. 1 there are provided a bearing 5 comprising balls 6 or other suitable rotary members held between an outer race 7 and an inner race 8, and a bearing 10 comprising balls 11 or other rotary members held between an outer race 12 and an inner race 13. The bearings are mounted only at their exteriors, the mounting means being connected only to the outer races 7 and 12 and serving to electrically separate the bearings as well as to mount the same. Assembly is thus facilitated, and standard unit bearings may be used. In the present instance the mounting is in the form of a sleeve 15 composed of insulating material such as phenol-formaldehyde or methyl-methacrylate resins, for example, and of such diameter that the outer races 7 and 12 can be frictionally fitted therein. A central opening 16 is provided in one or both of the races—in the present instance both—and thru these the insulated leads 18 and 19 of an extension cord 20 extend, the lead 18 being soldered to the inner race 8 and the lead 19 being soldered to the inner race 13, the insulation being removed from the very end of the lead in each instance. As exemplified the leads are soldered to the side of the race which is furtherest from the body of the cord 20, this making for ease of assembly since the lead 18 may be soldered to the left-hand side of the inner race 13 before the bearing 5 is put in place and lead 19 soldered to the left-hand side of the inner race 8 after the bearing 5 has been put in place. However, the leads may be soldered or otherwise permanently secured to any desired part or parts of the inner races which may be found to be practical and convenient in a particular instance, and, as will be apparent, if they are secured to the near side rather than the far side of the inner races, the opening 16 in the far bearing, e. g. the bearing 5, may be omitted. In any case, however, a very simple and readily assembled device results from extending the insulated connector through an opening or openings in the inner race or races rather than thru an interior mounting member.

Desirably and as exemplified there are provided means which will serve to prevent the bearings from contacting one another regardless of the conditions to which the swivel connection is subjected. To this end there is provided in the present instance an annulus 21 composed of insulating material and disposed between the bearing 5 and the bearing 10; this annulus being desirably put in place after a lead has been connected with the inner race 13 but before the bearing 5 is put in place.

Desirably also there are provided dust caps 21a and 22—the latter being formed with a central opening 22a—which are frictionally fitted within the sleeve 15. In assembly the dust cap 22 may be fitted over the cord 20 as a first step in the assembly and the dust cap 21a slid into place after the lead 19 has been secured to the inner race 8.

To the outer races 7 and 12 respectively there are soldered or otherwise permanently secured insulated leads 23 and 24 which may for example run to the terminals of an electrical appliance, the ends of the leads being exposed for contact with their respective races. In the present instance the sleeve is cut away at 25 to permit the lead 23 to be soldered to the outside of the outer race 7 and is cut away at 26 to permit the lead 24 to be soldered to the outside of the outer race 12.

Figure 2:
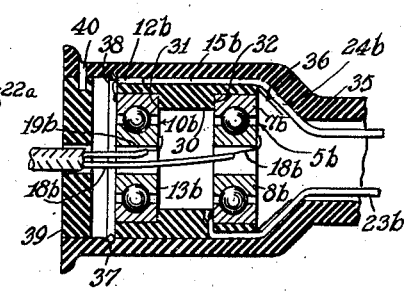
Fig. 2 is a similar view of an electrical appliance handle containing a modified form of swivel connection embodying the invention.
Figure 3:
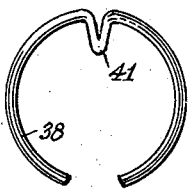
Fig. 3 is a detail view of the lock ring of Fig. 2.
Figure 4:
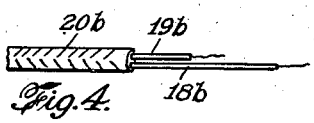
Figs. 4, 5, 6 and 7 show successive steps in the assembly of the swivel connection of Fig. 2.

In the form of construction exemplified in Fig. 2, there are provided bearings 5b and 10b which are generally similar to the bearings 5 and 10. These are mounted in a sleeve 15b which in the present instance is molded with an integral inner annular projection 30 providing shoulders 31 and 32 against which the outer races 7b and 12b are adapted to be disposed and which serve to positively prevent the bearings from moving toward each other. In the present instance, the leads 18b and 19b are soldered to the far sides of the inner races 8b and 13b respectively. Also in the present instance, the sleeve 15b is formed with a longitudinal groove 34 for the reception of the lead 24b which extends to the race 13b.

The entire connection is encased in an appliance handle 35, which may be composed of wood, plastic or other suitable material and which is interiorly bent in at the end closest the appliance to provide a portion 36 which limits the movement of the swivel connection in one direction. In order to limit the movement of the swivel connection in the other direction, the handle 35 is formed with an annular groove 37 just beyond the location of the swivel connection, and a lock ring 38 is adapted to be sprung into this groove to hold the swivel connection in place. Desirably a removable dust cap 39 is inserted into the end of the handle after the lock ring has been put in place, this being held in place by one or more screws 40 so as to be removable in case it is desired to remove the lock ring and the swivel connection. Pursuant to the invention in certain of its more specific aspects, the lock ring is specially formed to facilitate its easy removal, being interiorly distorted to provide a bend 41 which is readily engageable by a hook when removal is desired.

Figure 5:
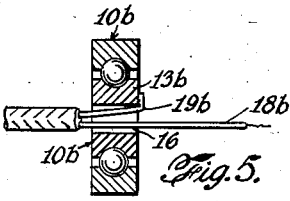
Figure 6:
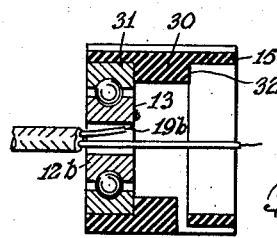
Figure 7:
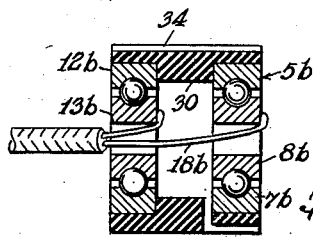

As shown in Figs. 4–7, the swivel connection may be readily assembled in accordance with the invention by slipping bearing 10b over the leads 18b and 19b and soldering the bare end of the lead 19b to the inner race 13b while the insulated lead 18b extends entirely through the opening 16 in the bearing 10b (Fig. 5). The sleeve 15b is now slid into place, as shown in Fig. 6, whereupon the bearing 5b is put in place and the bare end of the lead 18b soldered to the inner race 8 thereof to provide the swivel connection of Figs. 2 and 7. The lead 24b is then laid in the groove 34 and the bare end thereof soldered to the outer race 12b; and the bare end of the lead 23 soldered to the outer race 7b.

Figure 8:
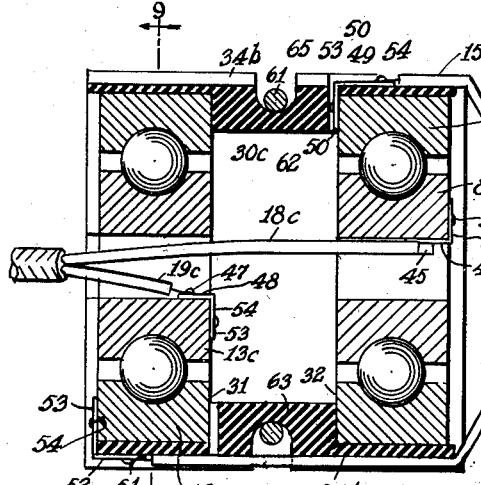
Fig. 8 is a large scale showing of another modified form of electrical swivel connection embodying the invention.
Figure 9:
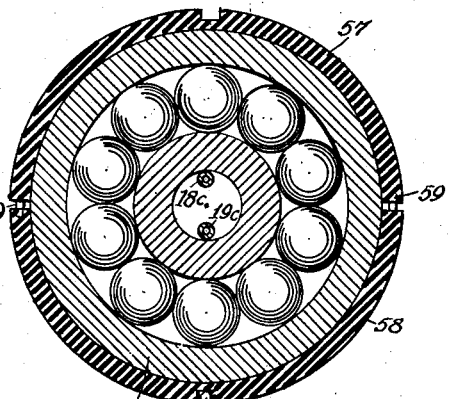
Fig. 9 is a sectional view along the line 9—9 thereof.

As above indicated, the leads may be electrically connected with and permanently secured to the races in a wide variety of manners. In Figs. 8–9, there is exemplified a form of construction wherein the connection is effectuated by spot welding to the ends of the races. As exemplified, the lead 18c is soldered at 45 to a lug 46 which has been welded to the race 8c, the lead 19c is soldered at 47 to a lug 48 which has been welded to the race 13c, the lead 23c is soldered at 49 to a lug 50 which has been welded to the race 7c and the lead 24c is soldered at 51 to a lug 52 which has been welded to the race 12c. Each of the lugs 46, 48, 50 and 52 is formed in the present instance with a transversely extending tab 53 and the welding of lugs to their respective races is effectuated in the present instance by a spot weld 54.

Figure 10:
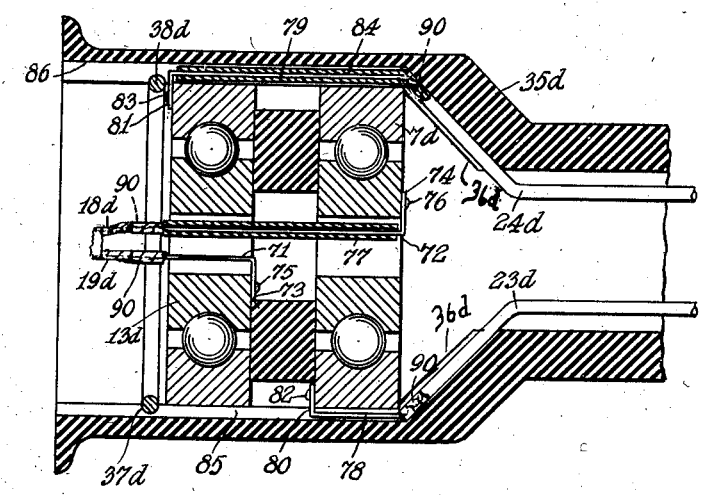
Fig. 10 is a view similar to Fig. 2 showing another modification.

Instead of forming the sleeve as a unit and pressing the races into a sleeve, the sleeve may be so formed that it may be put on after the leads have been secured to the races. In the construction of Figs. 8–9 as exemplified, or the constructions of Fig. 1 or Fig. 2 or in other possible embodiments if desired, the mounting may be formed of a plurality of parts which are capable of ready assembly. In Figs. 8–10, the insulating sleeve 15c, which as exemplified is formed with an inner annular projection 30c similar to the projection 30, is axially divided so as to form in the present instance two identical semi-cylindrical parts 57 and 58 one edge of each of which is formed with protuberances 59 adapted to fit into holes 60 in a juxtaposed edge of the other. A slip ring 61 fitting into two meeting semi-circular grooves 62 and 63 on the posts 57 and 58 respectively holds the sleeve in assembled position.

As will be seen, the member 58 is formed with a groove 34c for the reception of the lead 24c and is recessed at 64 for the reception of the lug 52. The member 60 is recessed at 65 for the reception of the lug 50.

In certain instances, an appliance handle itself may constitute the mounting for the bearings. There is exemplified in Figs. 10–11 one such form of construction. Bearings 5d and 10d separated by an insulating washer 70 are mounted directly in the handle 35d. A slip ring 38d fitting into a shallow annular groove 37 holds the bearing assembly against a shoulder 36d.

Figure 11:
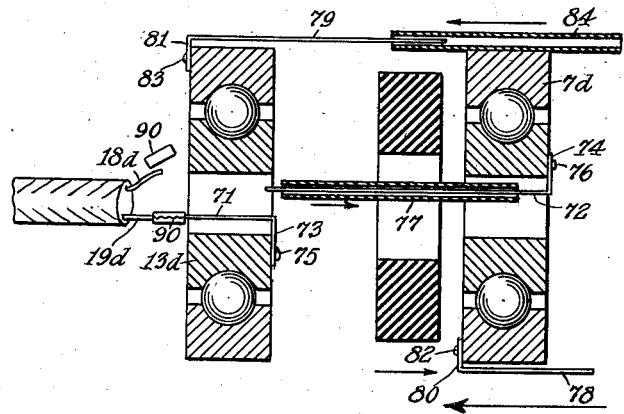
Fig. 11 shows a step in the assembly of the device of Fig. 10.

Instead of running an insulated flexible wire through the assembly to the far inner race, a stiff wire or elongated lug may be used. Figs. 10–11 also exemplify a construction of this sort. A stiff wire 71 is provided to connect the inner race 13d with the wire 19d and a stiff wire 72 is provded to connect the inner race 8d with the wire 18d. The bent over ends 73 and 74 of the stiff wires 71 and 72 respectively are spot welded at 75 and 76 to the far ends of the races, this operation being preferably performed at a stage well in advance of, and if desired at a place remote from, the stage and place of assembly.

Thus, each bearing-and-stiff-wire combination, such as shown at the left-hand end and at the right-hand end of Fig. 11 can be handled or sold as a unit.

Indeed, in various instances, as in certain electric appliances, one bearing will suffice for the swivel connection, the single bearing being mounted in an insulating handle, for example.

It is ordinarily desirable to insulate the wire and to this end the invention contemplates the use of a piece of tubular insulation formed from plastic for example, as exemplified at 77.

Wires may be secured to the outer races as in the previously described forms. In the present exemplification, however, stiff wires 78 and 79 are likewise provided at these points, the bent over ends 80 and 81 thereof being spot welded at 82 and 83 respectively. In the present instance also the wire 79 on the left-hand race is provided with an insulating tube 84 similar to the tube 77. The handle 35d is formed with a longitudinal groove 85 of medium depth for the reception of the wire 78 and with a longitudinal groove 86 of greater depth for the reception of the tube 84. Wires 23d and 24d extend to the stiff wires 78 and 79 respectively.

A manner of assembly of the exemplified bearing combination is exemplified in Fig. 11. At either end there is exemplified the unitary character of the stiff-wire-and-bearing combinations. The arrows indicate the manner in which the various other units may be moved if the left-hand bearing is held stationary.

The flexible wires 18d, 19d, 23d, and 24d, may be connected with their respective stiff wires in any suitable manner, as by soldering, preferably in a crimped sleeve as at 90; the soldering operation of the wires 18d and 19d being preferably performed before the insertion of the bearing 5d or the bearing assembly, if the assembly is first formed, into the handle, and the crimped portion taped.

The several electrical connections exemplified above are adapted for use with a wide variety of electric appliances such for instance as electric irons, electric soldering irons, electric hair curlers, etc., and also as connections for such devices as electric lights, electric plugs, and the like.

Since certain changes may be made in the constructions set forth and in carrying out the above method, and different embodiments of the invention may be provided without departing from the scope of the invention, it is intended that all matter contained in the above description or shown in the accompanying drawing shall be interpreted as illustrative and not in a limiting sense.

What is claimed is:

1. In combination an electrical swivel connection comprising a plurality of spaced bearings each having an outer conductive race disposed further from the axis thereof and an inner conductive race nearer to the axis thereof and rotatable conductive members therebetween and providing a conductive path therethru, each of said bearings extending about said rotatable members in one direction along said axis and in the other direction along said axis to grip the same on both sides whereby each race will itself prevent movement of the rotatable members in the direction of the axis, an exterior mounting for said bearings, said mounting providing insulation for electrically separating said bearings, the inner race near at least one end of the connection having a central opening therethru which is unobstructed and said connection being so formed that said opening continues unobstructed to another of said inner races, and a pair of electrical conductors extending thru said opening and respectively connected directly to the last-mentioned races whereby free relative rotation between the outer races and said conductors will occur, a casing adapted to receive said connection and provided with means for limiting its movement in one direction, and releasable means for limiting the movement of said connection in the other direction.

2. An electrical swivel connection as set forth in claim 1 wherein the conductors are spot-welded to the respective inner races.

3. An electrical swivel connection as set forth in claim 1 wherein the releasable means is in the form of a split ring.

THOMAS H. FAILE.

REFERENCES CITED

The following references are of record in the file of this patent:

UNITED STATES PATENTS

| Number | Name | Date |
|---|---|---|
| 913,831 | Low et al. | Mar. 2, 1909 |
| 1,324,278 | Scheel | Dec. 9, 1919 |
| 1,649,276 | Adam | Nov. 15, 1927 |
| 1,706,412 | Roberts | Mar. 26, 1929 |
| 1,746,159 | March | Feb. 4, 1930 |
| 1,768,260 | Larkey | June 24, 1930 |
| 1,917,803 | Loosli | July 11, 1933 |
| 1,928,865 | Moeller | Oct. 3, 1933 |
| 1,975,964 | Mayhew | Oct. 9, 1934 |
| 2,288,259 | Gladulich | June 30, 1942 |
| 2,238,319 | Goldfield | Apr. 15, 1941 |